Figure 1:
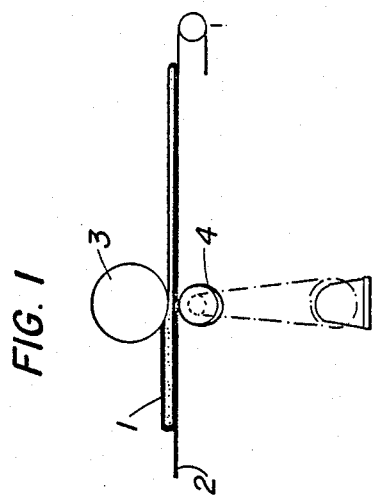

United States Patent [19]

Lammela

[11] Patent Number: 4,828,861
[45] Date of Patent: May 9, 1989

[54] METHOD AND EQUIPMENT FOR THE SPREADING OF DOUGH STRING

[75] Inventor: Martti Lammela, Turku, Finland

[73] Assignee: Hydrovoima Oy, Finland

[21] Appl. No.: 900,361

[22] Filed: Aug. 25, 1986

[51] Int. Cl.$^4$ .......................... A21D 8/02; A21C 3/00; A21C 3/02

[52] U.S. Cl. .................................... 426/496; 426/512

[58] Field of Search ............... 426/512, 496; 425/458, 425/383, 403.1, 373, 333; 269/289 MR

[56] References Cited

U.S. PATENT DOCUMENTS

| | | | |
|---|---|---|---|
| 787,274 | 4/1905 | Burns | 425/383 X |
| 2,888,888 | 6/1959 | Jorgenson et al. | 426/496 X |
| 3,838,998 | 8/1974 | Gross | 26/105 |

Primary Examiner—Peter Chin
Assistant Examiner—Thi Dang
Attorney, Agent, or Firm—McGlew & Tuttle

[57] ABSTRACT

The invention concerns the spreading of dough string when it moves on a cloth band. The spreading is effected by means of a pressing roll having a spiral like ridge around its periphery. The spiral runs from one end of the roll to the opposite end, but alters its spiral direction at the middle area of the roll. According to the invention the spiral roll is kept out of direct contact with the surface of the dough string by a cloth conveyed between the roll and the dough string with the advance speed of the dough. With this arrangement the rotation speed of the pressing roll can be selected independently of the advance speed of the dough string.

2 Claims, 4 Drawing Sheets

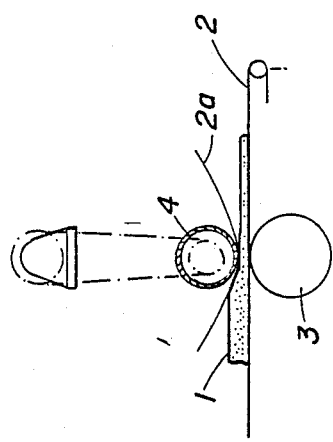
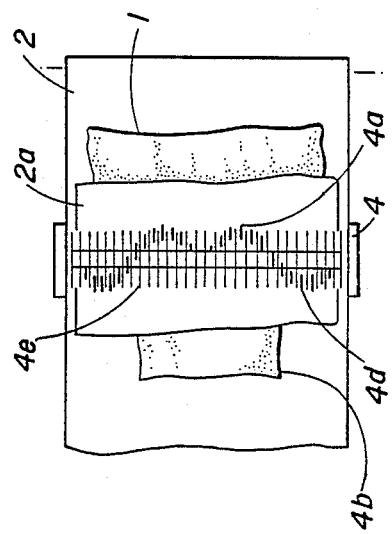
FIG. 8
FIG. 9
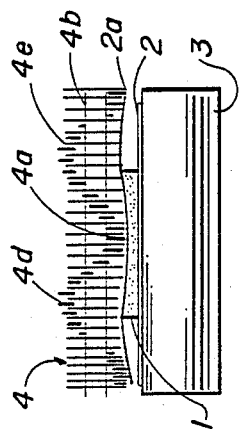
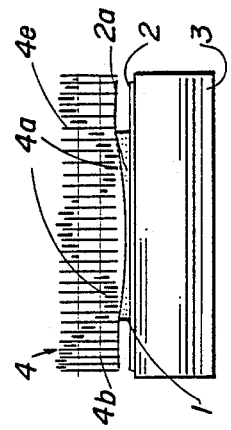
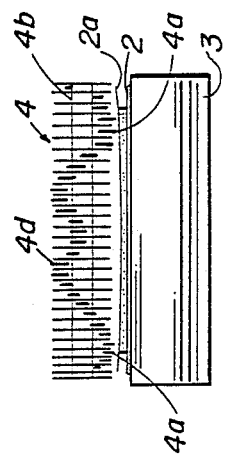
FIG. 10
FIG. 11
FIG. 12

METHOD AND EQUIPMENT FOR THE SPREADING OF DOUGH STRING

This invention concerns a method for mechanical spreading with the aid of a spiral roll of a string of dough material conveyed in one direction on an endless cloth belt along a principally horizontal track, which roll is arranged to impart an impression to the dough string material which impression simultaneously moves from the centre of the dough string towards the edges of the dough string when the roll rotates in one direction on the dough string, as well as an equipment for the accomplishing of this method, in which equipment is an endless cloth belt to convey the dough string material along a principally horizontal track, at one side of the cloth a transverse, preferably smooth counter-roll, adjustable in its setting for height, and at the opposite side of the cloth a pressing roll counteracting with the said counter-roll, the outer surface of the pressing roll being formed with a spiral ridge which on either side of the outer surface centre part moves in opposite directions towards the ends of the pressing roll in mirror image around the surface of the pressing roll so that the outer surface centre part forms a ploughlike tip.

In the mechanical manufacture of dough strings of wheat or similar constituents there are machines in use operating by different principles, such as the sheet rolling machine, the continuous rolling machine and the nozzle piece-forming machine.

With the sheet rolling machine the dough string is usually made ready by executing several rolling passes. On the other hand the continuous rolling machine and the nozzle machine are most commonly used for manufacture of dough strings which are only at a later process stage worked ready with the aid of sheet rolling machines of longitudinal and/or transverse type.

Dough strings manufactured in different ways may possess tensions acting in different directions and of different values. With a skilfully utilised sheet rolling machine the tensions and their directions can be obtained as desired. With continuous rolling machines and nozzle machines and with longitudinal sheet rolling a suitable longitudinal tension can be attained. By including to the equipment a transverse rolling unit a suitable tension can also be obtained in the transverse direction.

When using a transverse sheet rolling machine the dough string is so spread that dough strings to be made with continuous rolling or nozzle machines need not be equally large in breadth as the final dough string. Final width can be regulated by changing the force applied in transverse sheet rolling.

A drawback of the transverse sheet rolling machines is their mode of operation which does not take into account the advance speed of the dough string. In these transverse sheet rolling machines there are one or more rollers arranged to move transversely over the conveyor cloth and its accompanying dough string. To be theoretically correct the operating roller should be skewed according to the dough string speed. Possibility of such regulation is entirely lacking from the transverse sheet rolling machines of today, mainly for the reason that equipment operating thus would become very costly.

Dough string spreading equipments are also known which are furnished with a spiral roll for the formation of the dough string which roll is arranged to rotate at an equivalent speed to that of the advance speed of the dough string. Such an equipment is fully capable of spreading the dough string but it leaves bad surface marks on the spread dough string, that can only be taken out with difficulty, for example with a smooth roll after the spiral roll.

The purpose of the invention here presented is to eliminate the aforementioned drawbacks by means of a simple method, which imparts the desired transverse tension to the dough string and spreads the string of dough to the necessary extent. This has been achieved by the method, which is characterised in that the spiral roll which makes the impression is kept apart from the dough string material with the aid of a cloth or equivalent moving with this at the same speed, so that the rotational speed of the spiral roll is independent of the rate of speed of the string of dough material.

The invention also concerns equipment for the accomplishing of this method, which equipment is characterised in that the space between the pressing roll and the string of dough material is occupied either by a cloth belt to convey the dough string material or by another cloth or similar aid travelling with the same speed, whereupon the pressing roll, the spiral ridging of which extends rearwardly of the roll in the rotational sense for the distance of a single rotation around the roll as it extends from one end to the middle area of the roll and forwardly for a single turn when it extends from the middle area to the opposite end of the roll, can be rotated at high speed independently of the cloth speed rate.

The other characteristic features of the invention appear in the enclosed patent claims.

Figure 2:
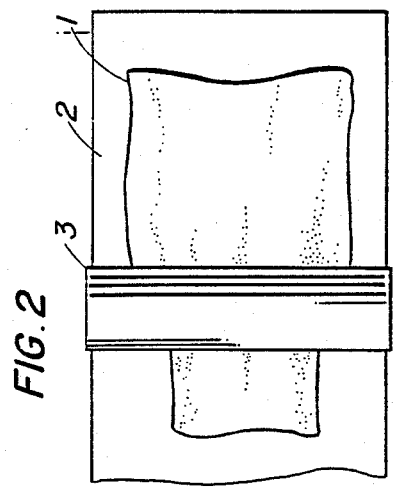
Figure 4:
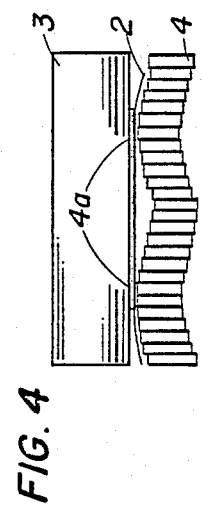
Figure 5:
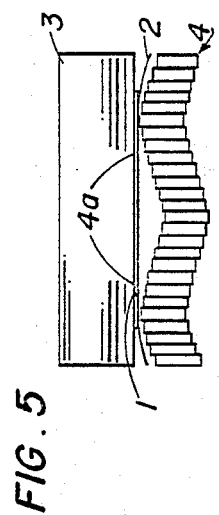
Figure 14:
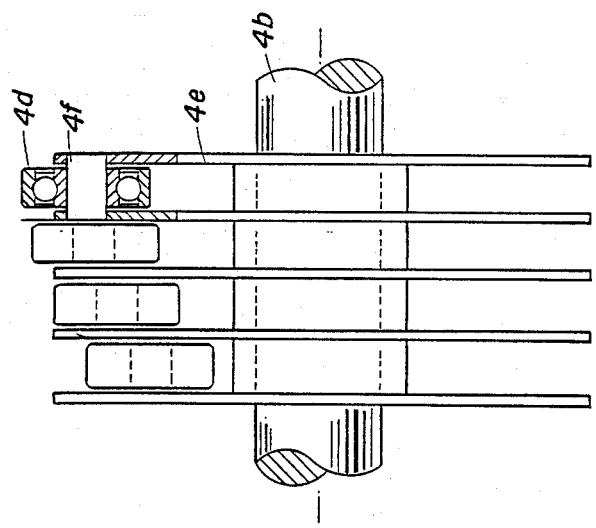
Figure 13:
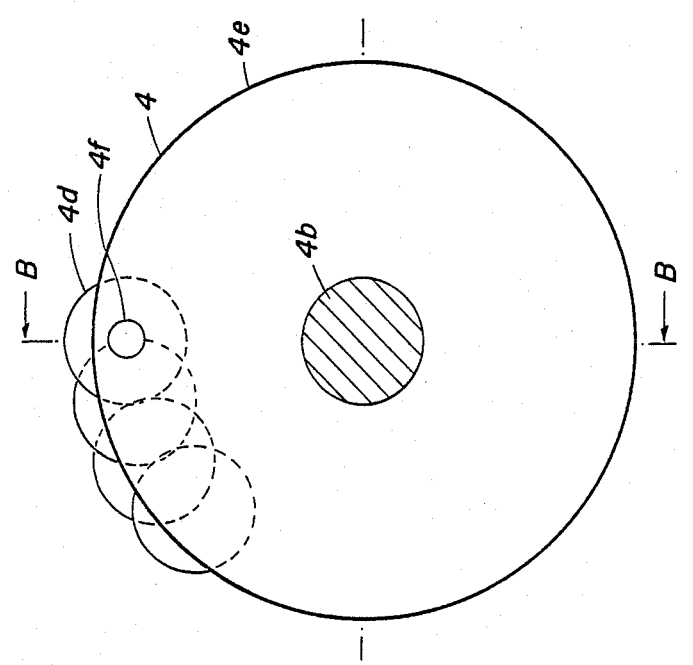

The invention is explained in the following by referring to the enclosed drawings, in which FIG. 1 presents an example of equipment according to the invention, as seen from the side, FIG. 2 - the same equipment as seen from above, FIGS. 3–5 three different phases of equipment operation as seen with the equipment in the horizontal direction, FIG. 6 enlarged view of the equipment pressing roll, as seen from its end, FIG. 7 cross-section of FIG. 6 along line A—A, FIG. 8 another example of equipment according to the invention, as seen from the side, FIG. 9 equipment according to FIG. 8, as seen from above, FIGS. 10–12 three different phases of operation of the equipment according to FIGS. 8–9, as seen with the equipment in the longitudinal direction, FIG. 13 an enlarged view of the equipment pressing roll, as seen from its end, and FIG. 14 the pressing roll according to FIG. 13 as seen with the equipment in the horozontal direction, partly sectioned.

The equipment according to the invention comprises the dough material in string form 1, to be conveyed along a principally horizontal track by an endless cloth belt 2, to the upper or lower side of which is a transverse, smooth counter-roll 3, adjustable in its height setting. On the opposite side of cloth 2, at the position of the counter-roll 3, there is, in the same direction and rotating at high speed, a pressing roll 4 onto the outer surface of which is formed a spiral ridge 4a. This ridge 4a runs on both sides of the midsection of the outer surface, in mirror image manner, between the aforementioned middle part and the corresponding end for about one rotation about the pressing roll 4 so that the middle part of the outer surface forms a ploughlike tip. The space between the pressing roll 4 and the dough string material 1 is taken up by either the cloth 2 to convey the dough string material 1 or another cloth or corresponding aid travelling at the same speed.

With such equipment the dough string material manufactured with a continuous roll or nozzle piece-forming machine is spread to its final width so that the spiral ridge 4a of pressing roll 4 is arranged to direct the rapidly repeating impression in the dough to move from its centre to both outer edges, while the pressing roll rotates at high speed and is not in direct contact with the dough string material 1. The special formation of the spiral ridge 4a of the pressing roll 4 in which at the centre part of the outer surface of pressing roll 4 is a ploughlike tip first affecting dough string 1 causing transfer of the impression imparted to the dough string material 1 simultaneously from the centre of the dough strip 1 towards both its edges whilst the pressing roll 4 rotates at high speed.

The purpose of the cloth 2, 2a passing between the dough string material 1 and the pressing roll 4 is to eliminate the detrimental effects on the dough of the difference in speed between dough string material 1 and pressing roll 4 and at the same time prevent the pressing roll 4 becoming dirty.

The frequency of the impresson made in dough string material 1, in other words the rotational speed of pressing roll 4 as compared to the travelling speed of the cloth, should be at least so high that apart from beating phenomenae a sufficiently smooth dough string 1 is achieved as the final result.

Figure 7:
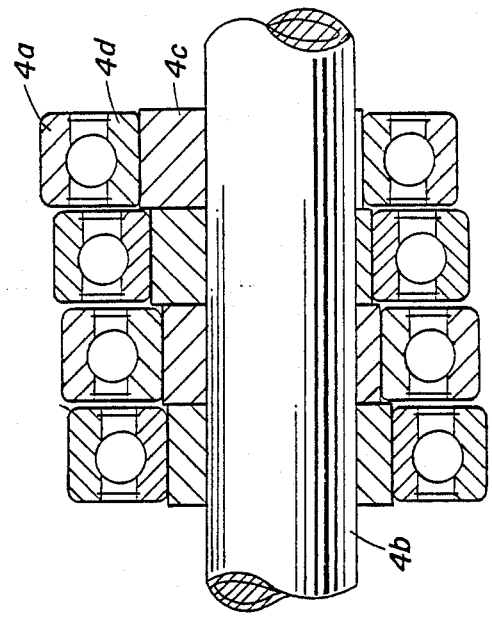
Figure 6:
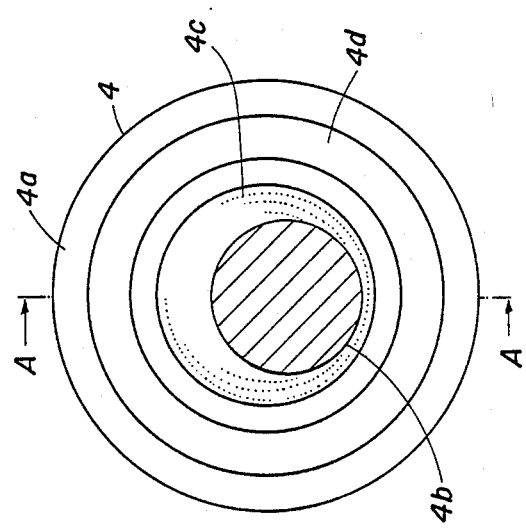

In pressing roll 4 there can be for example the arrangement as is presented in FIGS. 6 and 7, the similarly shaped eccentrics 4c being successively inserted and fastened to shaft 4b in a stepped spiralling relationship about the axis to obtain the spiral ridging 4a in question. Bearings 4d are arranged for eccentrics 4c to reduce to a minimum the friction at the outer surface due to the differences in speed between cloth 2, 2a and pressing roll 4.

Pressing roll 4 may also include, threaded over shaft 4b at equidistant intervals, disklike plates 4e, when into each of the spaces between plates 4e, a small-sized bearing 4d or wheel rotating about its own shaft 4f is fitted. The shaft is fastened to adjacent plates 4e that limit the intervening space in question, near to their periphery in the direction of the main shaft 4b of the pressing roll 4 so that the bearing 4d or the wheel partly projects out beyond the periphery of plates 4e. The bearings of pressing roll 4 or the wheels are arranged relative to each other so that the spiral ridge 4a in question is made. Such a pressing roll 4 is presented in FIGS. 13 and 14.

In FIGS. 1-5 an equipment is presented in which the pressing roll 4 is located below the cloth 2 to convey the dough string material 1, and then the counter-roll is in direct contact with the dough string material 1. It is clear that the cloth 2 for the conveyance of the dough string material 1 must be of flexible material in order that the ridging 4a in pressing roll 4 can efficiently have effect on the dough string material.

Figure 3:
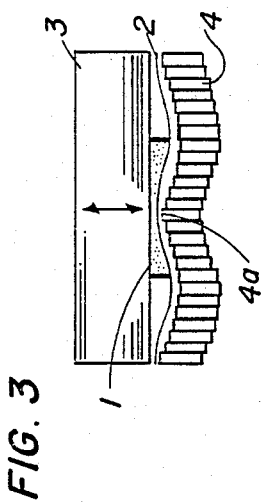

In FIG. 3 it is illustrated how the ploughlike tip of the ridging 4a at the centre part of the outer surface of pressing roll 4 presses the centre part of the dough string material 1 against counter-roll 3 so that the dough moves towards both edges of the dough string 1. The ridging 4a, which extends from the centre part of pressing roll 4 extending towards both its ends in opposite directions spiralling about one rotation about pressing roll 4, on rotation of pressing roll 4 presses the dough more and more out towards the edges of dough string 1 so that the dough string 1 spreads, as can be seen from FIGS. 4 and 5. In FIG. 4 the pressing roll 4 has rotated about half a revolution and in FIG. 5 about three-quarters of a revolution. The revolution speed of the pressing roll must then be so high that the pressing roll is able to rotate at least once, and preferably several times in that time in which one and the same part of the dough string is in the effective area of the pressing roll.

The pressing roll 4 can also be above the cloth 2 conveying the dough string material 1, whereupon another cloth 2a is arranged between the pressing roll 4 and the dough string material 1, which travels at the same speed as the cloth 2 conveying the dough string material 1. Such an equipment is presented in FIGS. 8–12. In the equipment presented the pressing roll consists of shaft 4b the plates 4c mounted to it and small-sized bearings 4d. But it is clear that a pressing roll consisting of eccentrics threaded onto the shaft can also be in question.

In FIGS. 10-12 the operational principle of this equipment is presented.

The means of mounting the bearings to the pressing roll is in part a question of technical construction, but in part it may also be of operational significance in certain circumstances, since the form of the ridge 4a achieved with eccentrics is more sloping than the ridge 4a constructed of bearings fastened to small-sized plates 4c.

In FIGS. 1 and 8 the motor to be used with pressing roll 4 is also shown.

The equipments according to this invention are noticeably simpler in construction than the previously known equipments to spread dough string materials and furthermore they do not cause noise and vibration like current transverse sheet rolling machines.

What is claimed is:

1. A method for the mechanical spreading of dough material, using a spiral spreading roll and a smooth, adjustable counter roll which cooperate to define between them a dough receiving gap and an elastic, separating, endless cloth comprising conveying the dough in a string form on the cloth belt along a substantially horizontal track through the gap between the spiral roll and the center roll, with the spiral roll located below the counter roll separated from the dough-string by means of said elastic, separating, cloth belt and being driven at a high linear speed, greater than, and independent of, the linear speed of the dough-string so that the spiral roll imparts an impression to the dough by a beating action forcing some of the dough material transversely from the center of the dough-string towards its edges.

2. A method for the mechanical spreading of dough material, using a spiral spreading roll and a smooth, adjustable counter roll which cooperate to define between them a dough receiving gap and an endless cloth belt running between the dough material and the spiral roll, comprising conveying the dough in a string form on the endless cloth belt along a substantially horizontal track through the gap between the spiral roll and the counter roll, with the spiral roll above the counter roll, while passing an elastic, separating, cloth belt along the upper side of the dough-string at the same speed as the conveying cloth belt and driving the spiral roll, separated from the dough-string by means of said elastic separating cloth belt, at a high linear speed, greater than and independent of the linear speed of the dough-string so that the spiral roll imparts an impression to the dough-string by a beating action, forcing some of the dough material transversely from the center of the dough-string towards its edges.

* * * * *